(12) United States Patent
Andrea et al.

(10) Patent No.: US 6,601,978 B2
(45) Date of Patent: Aug. 5, 2003

(54) HANDLE ASSEMBLY FOR VEHICLES, USED PARTICULARLY FOR ILLUMINATING THE REAR REGISTRATION PLATE ON AUTOMOBILES

(75) Inventors: Collavo Andrea, Oderzo (IT); Barbisan Alberto, Oderzo (IT)

(73) Assignee: Sapa Autoplastics SpA, Pordenone (IT)

( * ) Notice: Subject to any disclaimer, the term of this patent is extended or adjusted under 35 U.S.C. 154(b) by 0 days.

(21) Appl. No.: 09/909,604

(22) Filed: Jul. 20, 2001

(65) Prior Publication Data

US 2002/0018346 A1 Feb. 14, 2002

(30) Foreign Application Priority Data

Aug. 4, 2000 (IT) ..................................... TV2000A0093

(51) Int. Cl.[7] .................................................. B60Q 1/56
(52) U.S. Cl. ........................ 362/497; 362/496; 362/155
(58) Field of Search ................................ 362/496, 487, 362/497, 501, 505, 544, 154, 155, 399; 40/204, 206

(56) References Cited

U.S. PATENT DOCUMENTS 2,241,647 A * 5/1941 Simon ......................... 362/497
2,454,722 A * 11/1948 Slamka ........................ 362/497
5,270,909 A * 12/1993 Weiss et al. ................. 16/110.1
6,070,998 A *  6/2000 Jennings et al. ............. 362/100
6,135,621 A * 10/2000 Bach et al. .................. 16/110.1

FOREIGN PATENT DOCUMENTS

EP           0074027 A1 *  3/1983

* cited by examiner

*Primary Examiner*—Sandra O'Shea
*Assistant Examiner*—Hargobind S. Sawhney
(74) *Attorney, Agent, or Firm*—Harrison & Egbert

(57) ABSTRACT

A handle for illuminating the rear registration plate on automobiles and for opening the boot of the car, made up of an attractive support and an integrated insert, which has two bodies formed longitudinally, joined and sealed around their edges, in order to form a common chamber, with an opening on one side which passes through to the outside, and through which the connector is passed, and which has a co-moulded seal on the outside; the two bodies are made up of: a half-casing shaped on the inside surface in order to position the base of a support for at least one light-body and, if required, a mechanism for opening the boot; the base operates in conjunction with a conductor, in order to attach each of the mechanisms to its respective external controls; a counter-shaped cover with a protector for the light-body and illumination, and in which the said cover has, if required, a membrane which is flexible under pressure, for the opening mechanism of the boot.

14 Claims, 4 Drawing Sheets

HANDLE ASSEMBLY FOR VEHICLES, USED PARTICULARLY FOR ILLUMINATING THE REAR REGISTRATION PLATE ON AUTOMOBILES

BACKGROUND OF THE INVENTION

1. Field of the Invention

The object of this invention is a handle assembly for vehicles, used particularly for illuminating the rear registration plate on automobiles.

The invention has particular, but not necessarily exclusive, application in the sector involved in the production of finished components for the automobile industry.

2. Description of the Related Art

Vehicles, such as automobiles, are widely used. Each one has a means of identification, which is a registration plate with a series of letters and numbers, with one at the front of the vehicle and one at the back.

The front one, as is well known, is not illuminated, while the rear one is well lit, as is required by the law in all countries, in order to make it easier to be read, especially at night.

To make it even easier to read, the registration plate is located in a position in order to make it more legible, and one of these positions is often on the door of the boot.

Since the door is fastened and hinged to the chassis of the car, it obviously has to be opened and closed in some way in order to gain access to the inside of the boot of the car. This leads to the companies involved in the sector requiring a single component which fulfills more than one function. This is made possible by using a handle which allows a hand to be inserted in order to open the boot or for it to be opened by using a control means, and which is also used to house the lighting system for illuminating the rear registration plate.

The said handle, which is a translation from German of the technical term known as "griffleist", is to be found in a wide variety of more or less similar examples which are very widespread, a fact which certainly does not help in the development of the article, and there are a number of persistent drawbacks to this system, which today are no longer acceptable.

Traditionally, a handle is made up of basically two elements. The first element is a longitudinal support, with an aesthetically pleasing shape used for trimming purposes, also known by the term "blende". The second element, or support, when joined on the bottom side of the first element, allows the lighting equipment used for illuminating the rear registration plate and, where foreseen, the boot opening mechanism to be housed. In the most common solutions, the support element is usually made out of a single piece of moulded plastic and has two distinct seating units, positioned to the side of the central area used as a hand grip. Each seating unit is made in order to position the relative lighting units, made up of a light bulb, a bulb holder and a cover, and which is closed off by a protective lens which sits on a seat around its perimeter, formed by lowering the area close to the access openings for the said seats. While the external side of the support is basically flat, the inside part has a series of sectors and seating areas of various shapes and sizes in order to house the electrical wiring for the lighting units, and in order to attach it to the boot of the car. Basically, it is a single body that is shaped and formed so that none of the internal components may come into contact with each other. Once the support and the trimming are joined together by uniting the various attachment points, there are various parts which are pre-assembled beforehand, that stick out from the back of the support and that are used for attaching it to the metallic part of the boot. These parts may be the holders for the lighting units, while in the middle of the support there is the electro-mechanical boot locking mechanism with its relative socket, used to connect it to the main control unit.

To guarantee a good joint between the handle and the door of the boot, there are a number of holes drilled in the door of the boot where the parts that protrude from the assembled support are inserted. Finally, to avoid water leaking in to the joint of the said two parts, the handle has a soft seal over the whole of its surface.

A second solution, which is used by various automobile manufacturers in order to overcome some of the problems regarding the first solution, foresees the use of box-type modules that are snapped on to the trimming. According to each solution, these modules may include either the lighting unit or the electro-mechanical boot-opening mechanism. For obvious reasons, this type of solution also has a seal between the joint of the handle and the door of the boot.

Yet another solution has been recently adopted -by another automobile manufacturer. This solution also has a trimming or "blende", and which has a pseudo-technical insert attached to it. The characteristic of the said insert is that it has only a single support, which completely integrates the two lateral lighting units of the registration plate. The said support is made from one single, longitudinal element which may be attached to the trimming without fastening it or using adhesives, but by using its back part which is coupled to the longitudinal isolating support base at the ends of the light holders. The said base has a seal made out of flexible material on the opposite side to where the moulded circuit is positioned, and which extends over the whole of the surface which comes into contact with it when the handle is attached to the door of the boot. Finally, the said insert does not operate in conjunction in any way with the boot-opening mechanism. There now follows a brief word regarding the membranes which, when subjected to pressure, act upon the control for the boot-opening mechanism. As was previously observed, there is a specially shaped portion in the handle between the two lighting units that are used to illuminate the registration plate, where it is easy to insert the fingers of a hand so that, by applying a certain pressure at the ends, the boot door may be unlocked and opened. Going further into detail, the fingers press on an area which has a membrane formed on the bottom of the central housing unit. The membrane is made up of at least one perimetral ring with elastic properties, with a stretch of rigid material along its central and internal side portion. On the inside of the said support, a slight deformation of the membrane due to pressure acts upon a lever which, being pivoted, acts upon the micro used for opening the boot In the solutions described above, there are various drawbacks, some of which are in common.

For example, all the above solutions have a large number of components which obviously have to be organised correctly by the stockhouse personnel.

The use of a large number of components to construct the handle means that the assembly phase is long and arduous, and requires a lot of labour with consequently high labour costs which weigh quite heavily on the overall cost of the product and, thus, on the market price. One of the most immediately felt consequences of using a large number of components, along with the fact that the support unit used to contain the components is not standardised, is that it is not very flexible, not very reliable because of its inherent complex nature and the fact that it is not particularly innovative. These are all aspects that make it difficult to justify the high production costs involved, and which are certainly not in line with the requirements of a dynamic company.

With reference to the first type of handle in particular, one of the most frequent drawbacks is given by the fact that the door of the boot has a large number of holes drilled in it in correspondence with the joint surface of the handle. This may give rise to rust problems if there is an infiltration of water between the components, in spite of the use of a seal, and under certain circumstances, the seal may even worsen the phenomenon.

A second aspect which must certainly not be overlooked, regards the fact that the lighting units, as with the boot door opening switch, are not in a perfectly insulated, waterproof position, and the presence of humidity is quite common which leads to electrical problems.

A further drawback regards the assembly aspect which, in the solutions described in this document, is very long and arduous due to the fact that there are various parts that have to be stuck together, which add to the already high production costs.

A further negative aspect is given by the fact that the boot door opening switch is indirectly operated by the membrane, which means that it has to be extremely complex and oversized.

In the second solution described above, some of these drawbacks appear to have been eliminated by adopting the use of modules. However, it is still quite a complex system, and a soft seal is still required in order to guarantee a certain waterproofing for the equipment and mechanisms contained inside, and must be applied to the entire surface of the back of the support. Bearing the above in mind, it seems evident that even with this solution the problems regarding waterproofing, which is not guaranteed, are still present. From an operational point of view, the assembly is still quite complex and requires long assembly times and a lot of labour.

Finally, even the third solution does not solve the problems previously mentioned and, what is more, gives rise to others. Briefly, this solution also has a seal applied to the entire surface of the back of the handle which is to be attached to the boot door, as with the other solutions. This characteristic undoubtedly leads to poor functioning of the equipment because, while it may prevent water infiltrating into the support, it also covers components which contain conductors, such as the base unit itself, which may lead to localised rust problems.

For this reason, the companies that operate especially in the automobile components supply sector require alternative systems that are also an improvement on the ones currently adopted.

BRIEF SUMMARY OF THE INVENTION

These and other objectives are reached through this invention according to the characteristics in the attached claims, overcoming the problems outlined by means of a handle for vehicles, used particularly for illuminating the rear registration plate of automobiles and for opening the door of the boot, made up of a monolithic trimming and a support inserted into the said trimming, which has pre-assembled units for illuminating the registration plate and, if foreseen, in an intermediate position, a mechanism for operating the unlocking of the boot door. The said support comprises an integrated support made up two longitudinal bodies which are joined together around their perimeters, are waterproof, and in which:

the first body includes a half-casing shaped on the inside surface in order to position the support base for at least one lighting unit and, if required, a mechanism for opening the boot; the said base operates in conjunction with conductor means, and has at least one moulded circuit along one of its sides in order to connect each of the said mechanisms to its respective external controls;

a second body is made up of a counter-shaped cover with, in correspondence with at least one lighting unit, an opening with a means for the protection of the lighting unit and light diffuser, in which the said cover has, if required, a membrane which is flexible under pressure and acts in correspondence with the opening mechanism of the boot;

and in which, inside the said integrated insert, there is a common chamber for the housing of the lighting units, and in which said insert there is an opening through to the outside for passing electrical cables and the connector, with the said opening having a co-moulded seal made out of non-rigid material.

In this way, through the creative contribution that has the effect of constituting an immediate technical progress, various advantages are achieved.

Firstly, it is possible to have an integrated insert which is extremely compact and waterproof, and in which the possibility of the infiltration of water or even the formation of condensation is drastically reduced. In the unlikely event of this happening, the special conformation of the chamber together with its interaction with a flue pipe means that the average temperature of the system and, therefore, the conditions that promote the formation of condensation is reduced. At the same time, under normal conditions, the special conformation of the chamber together with the flue pipe also help to evacuate the heat that is generated by the lighting units, thus avoiding a series of complex problems.

On the other hand, the relatively simple construction by standardising the components, together with a reduction of the number of components that are required, means that there are fewer items to be coded and organised, the product is more reliable and virtually maintenance-free, very flexible and, because of these advantages, extremely interesting for both the manufacturer and the customer.

From a structural point of view, along the back part of the handle/boot door assembly, all the protrusions are eliminated, except for the connector, which previously obliged the manufacturer to indiscriminately perforate the boot of the car. This means that the possibility of rust or corrosion forming in that area is drastically reduced, or even eliminated. The problem has been overcome by eliminating a large part of the surface of the soft, flexible seal which was used on the original handle, helping to create a structure which, in the case of water entering between the trimming and the insert, is able to easily drain off the said water.

In conclusion, these advantages lead to important benefits and a product which costs much less than the previous models without losing anything from a quality point of view, and even improves the product in certain aspects by introducing a high technical content.

BRIEF DESCRIPTION OF THE SEVERAL VIEWS OF THE DRAWINGS

These and other advantages will be shown in the following detailed description and attached schematic drawings of a preferred solution, the particulars of which are to be considered simply illustrative and not limiting.

Finally.

DETAILED DESCRIPTION OF THE INVENTION

Figure 1:
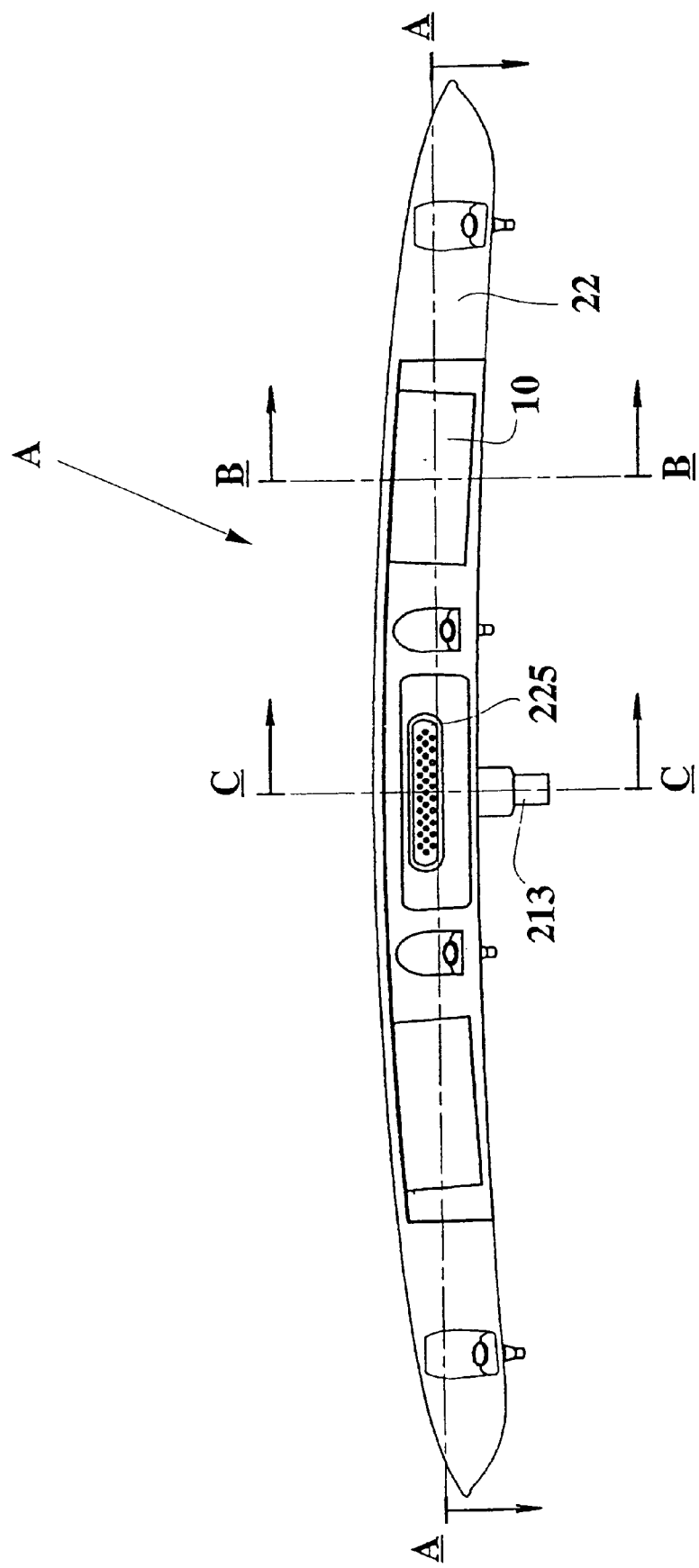
FIG. 1 is a schematic view from the lower side of a handle for automobiles, with lighting units for the illumination of the rear registration plate and, in an intermediate position, a mechanism to open the boot door.
Figure 2:
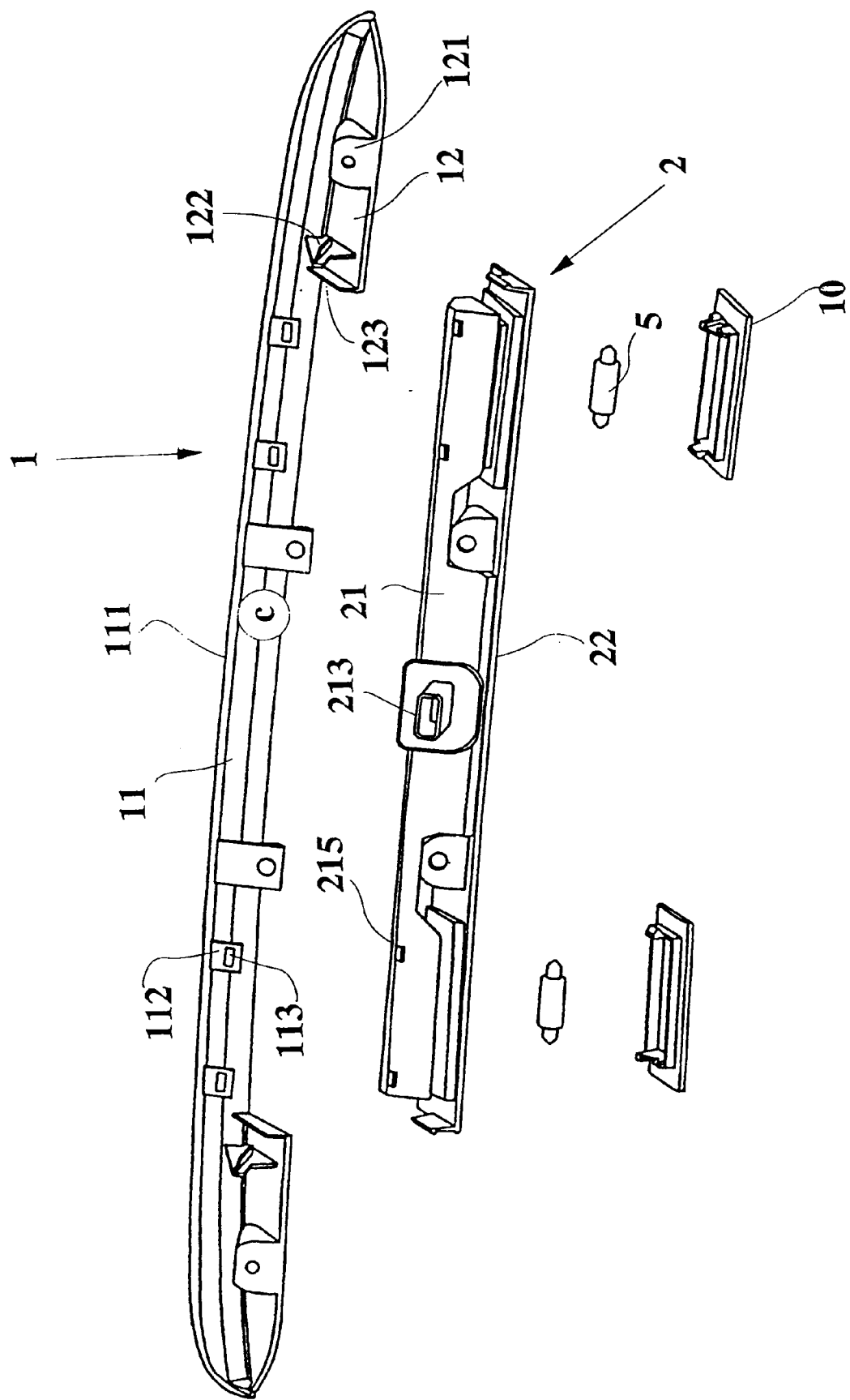
FIG. 2 is an exploded viewed of the handle for automobiles, as shown in the previous figure.
Figure 3:
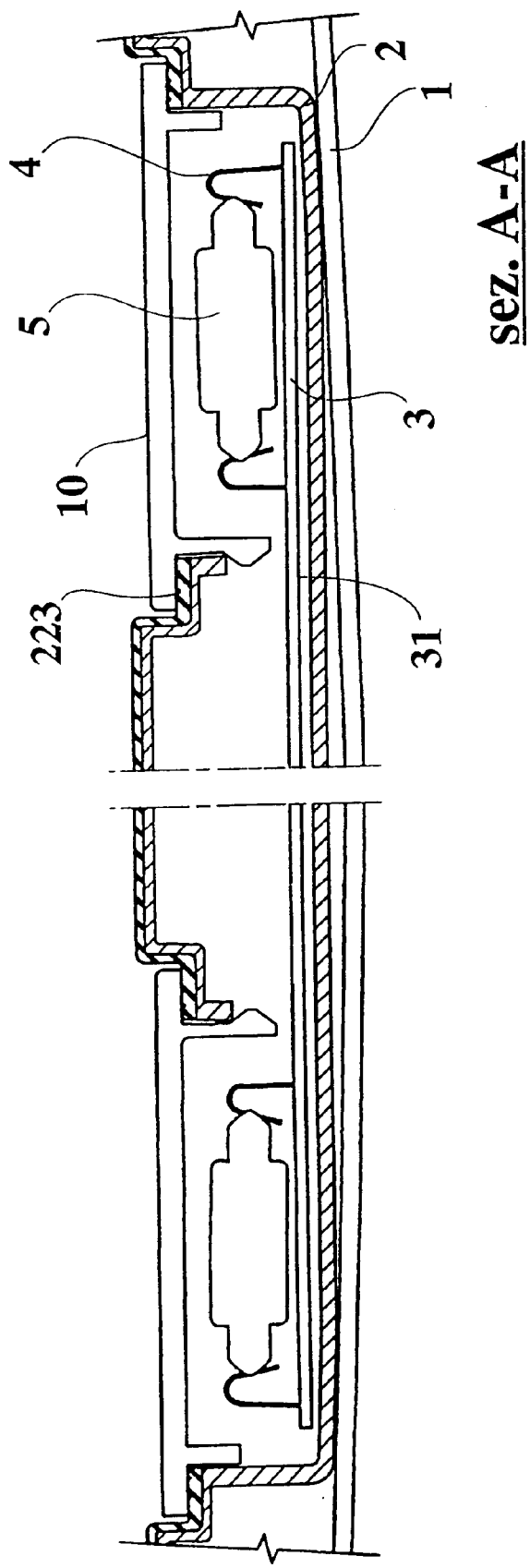
FIG. 3 is a longitudinal, partial sectional view of the handle as shown in FIG. 1, along the A—A axis.
Figure 5:
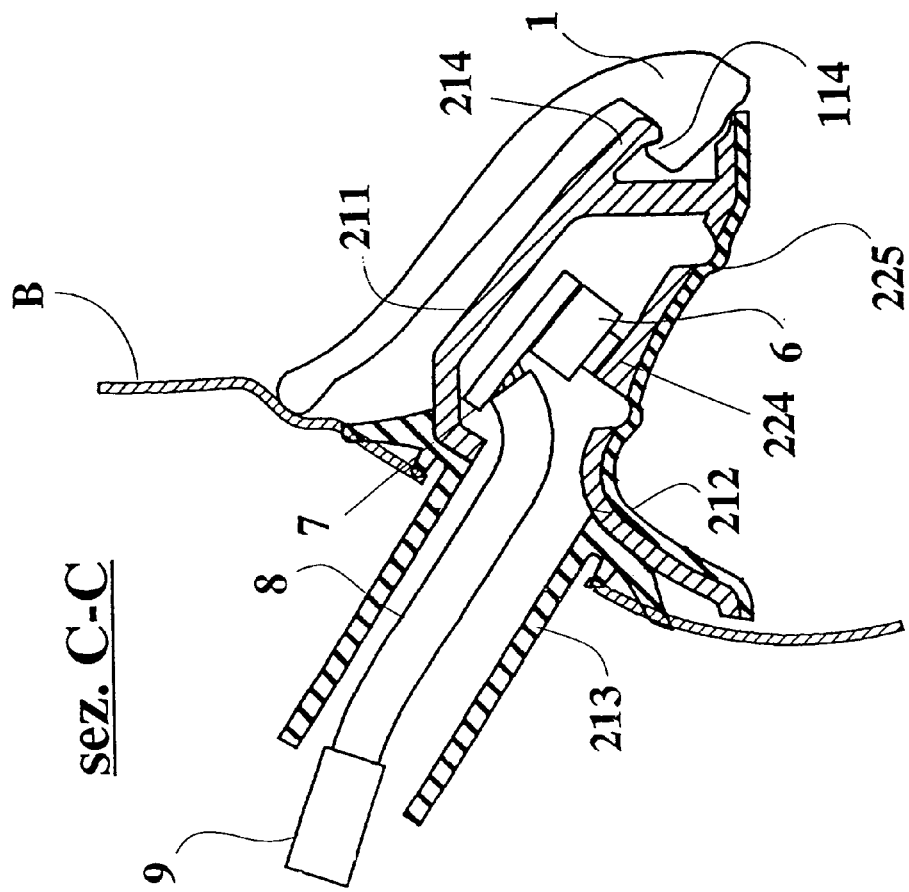
FIG. 5 is a sectional view of the handle as shown in FIG. 1, along the transversal C—C axis.
Figure 4:
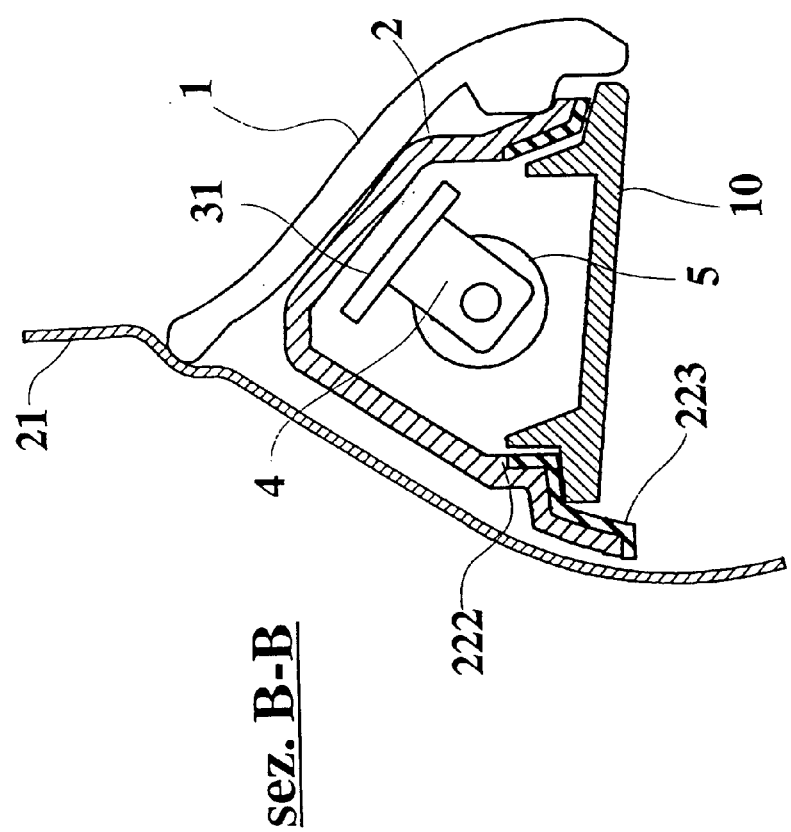
FIG. 4 is a transverse sectional view of the handle as shown in FIG. 1, along the B—B axis.

The invention contained herein regards a-handle assembly (A) for vehicles, used particularly for illuminating the rear registration plate in automobiles and for opening the door of the boot (B) to gain access to the boot itself.

Going into detail, the handle (A) is made up firstly of a trimming (1) out of plastic material, which is a longitudinal, monolithic body open on one side, with the upper side (1), rounded off and on view, and the lower side (12) joined together longitudinally along one of their ends that is in common. Along the border (111) of the upper part, there are small tabs (112) that point downwards, with rectangular openings (113) used to fasten it to the integrated insert (2) which is inserted inside the said trimming (1). The lower part (12), which is blended in to the side (11), is to be found at the two opposite and symmetrical ends of the handle (A), leaving an empty space in the middle part and for a certain length of it, in order to form a seat (c) which is used to position the said integrated support (2). In this way, the ends of the handle (A) have basically a tapered shape, and are closed to form a half-casing. Along the remaining part of the lower side (12), which is to be found at each end of the trimming, there are seats (122) which protrude and which are used to fasten the handle assembly (A) at its ends to the door of the boot of the automobile (B). There is also a reinforcing rib 122) for each end, which provides localised reinforcement for the two surfaces (11, 12) and a border (123) which denotes the end of the side portion (12).

A support made up of an integrated insert (2) is joined to the trimming (1) in the relative seats (c). It is made up basically of two parts (21) and (22), the first of which is a half-casing permanently closed off by a cover (22) and welded at the contact points around their perimeter. The two lighting units (5) are inserted inside the half-casing (21), along with the means for connecting them to the external control units. If required, a mechanism (6) for opening and closing the door of the boot (B) and which is operated externally, consisting of a micro, may also be inserted, and is positioned between the two lighting units (5). Regarding the half-casing, it is made up of a longitudinal monolithic body with basically a trapezoid cross-section. It is shaped in order to have at least one side (211) which, because of its flat shape, is put over the corresponding internal, flat surface of the side (119) of the trimming (1) during assembly.

In the half-casing (21), along the internal surface of the side (211), an insulating support (3) is inserted and snapped in position, and which is used to anchor bulb-holders (4) at the ends. The power for the bulb holders (4), in order to illuminate the relative bulbs (5), is fed by a circuit moulded along the base (3) of the lower side (31), which is opposite the side to which the said bulb holders (4) are fixed.

A further possible function of the base (3) is to hold a pair of micros (6) for opening the door of the boot (B) in position, on the same side and in the central portion of where the bulb holders (4) are fastened. The micros (6) are also connected to a relative circuit, which is moulded into the base (3) along the lower side (31), so that there are no loose cables inside the half-casing (21). In this way, the only cables (7) inside a common sheath (8) that connect the respective circuits are held together and connected in one position only, on the lower side of the base (3), and are then connected at the other end to a common connector (9). In order to take the cables (7) and connector (9) to the outside of the integrated insert (2), there is an opening (212) on the bottom of the half-casing (21).

Going further into detail, in correspondence with the said opening (212), there is a moulded, thermoplastic seal (213) which extends towards the outside in the form of a flue pipe. In this way, a further function of the said opening (212) with the flue pipe (213) is, on the one hand, to ventilate the inside of the integrated insert (2) promoting the release of the heat created in the common chamber that contains the equipment (5, 6), while on the other hand it helps to avoid the formation of humidity.

In one case, to help the circulation of air even further, the flue pipe (212, 213) may also be formed with a longitudinal sector divider, which basically divides and facilitates the two directions of the circulation, respectively the inlet and the outlet of the flow of air.

In a second possible example of flue pipe (212, 213), there are two tubular channels for the flow of air, which may even have different diameters, in which the first external one is coaxial with respect to the channel (7), a sheath (8), a connector (9) and a second channel which is inside the first one, which stretches into the common chamber. As an alternative, for example in a solution which foresees concentric channels, the group of cables (7), sheath (8) and connector (9) are basically inverted, and they pass through the central channel.

A third and final option for the flue (212, 213) consists in having an elbow-shaped tubular element, which may also have different diameters. In this case, there is a portion which is perpendicular with respect to the chamber, followed by a short, orthogonal portion and a second perpendicular portion. Along one side of the said orthogonal portion, and which coincides with base of the second perpendicular section, there is a hole. In this way, there is a Venturi effect, which further helps in improving the circulation of the air.

Finally, a counter-shaped cover (22) is joined to the half-casing (21) and is welded to it around its perimeter. In this case, the said cover (22) has openings (222) at its ends with a seal (223) around the perimeter in order to guarantee a water-tight seal with the transparent lens (10). The cover, in correspondence with the areas which coincide with the micros (6) and which are underneath and housed in the half-casing (21), has a flexible surface which, when pressed, activates both said micros (6) evenly. Going further into detail, the said surface (225) has a small portion of rigid plastic (224) that extends from one side to the other, in correspondence with and above which a layer of soft material (225) is moulded. This material, because of the gap around the perimeter of the rigid plastic portion (224) and because of its plastic properties, acts as a membrane and provides sufficient return force to allow the micros (6) to be deactivated.

Once the integrated insert (2) has been assembled, it is attached to the plastic support (1). This operation is extremely simple, and is carried out by simply snapping it in place. In order to carry out this operation, there is a protruding longitudinal tooth (214) along the outer side of the half-casing, which clips into a corresponding seat (114) formed along the lower side and towards the inside of the trimming (1). It is then fastened into place on the other side by means of flexible teeth (215) which stick out and coincide with the position of the tabs (112) which are to be found along the trimming (1).

We claim:

1. A handle assembly for a trunk lid of a vehicle comprising:
   a longitudinal monolithic trimming formed of a plastic material, said trimming being open on one side thereof, said trimming having a seat in a central area thereof;
   a support housed within said central area of said trimming, said support having a single opening formed therein, said single opening having a seal formed therearound, said single opening defining a flue of a tubular fitting form, said support comprising:
     a first body having a half-casing;
     a second body having a counter-shaped cover permanently joined by welding around a perimeter thereof to said first body so as to be water-tight, said second body having said opening formed therein, said cover having a membrane which is flexible under pressure;
     a lighting means for illumination of a license plate of the vehicle, said lighting means comprising at least one lighting unit having conductors and external controls, said conductors extending through said single opening of said support, said half-casing having an inside surface receiving a support base, said lighting means supported on said support base, said lighting means having a lens means positioned in said opening of said second body, said lens means for protecting said lighting means and for diffusing light from said lighting means; and
     an opening means for opening the trunk lid, said opening means positioned on said support base, said membrane being cooperative with said opening means.

2. The handle assembly of claim 1, said trimming having a holding means for the support, said holding means comprising:
   a series of tabs having openings along an edge of an upperside thereof, said series of tabs each pointing downwardly; and
   a corresponding seat formed along a lower side of said series of tabs and toward an interior of said trimming.

3. The handle assembly of claim 1, said support being formed by welding said half-casing to said cover at contact points around the perimeter thereof, said support housing two lighting units, said two lighting units having conductor means for connecting two lighting units to the external controls, said support housing said opening means, said opening means comprising two microswitches positioned between said two lighting units.

4. The handle assembly of claim 1, said support having an insulating support positioned along an internal surface of a side thereof, said insulating support being inserted and snapped into position onto said support, said lighting means further comprising bulb-holders, an upper part of said insulating support anchoring an end of said bulb-holders therein, said lighting means having a circuit molded along said insulating support and connected to said bulb-holders so as to pass power to said bulb-holders, said circuit positioned opposite to said insulating support.

5. The handle assembly of claim 4, said insulating support having an intermediate position on the same side used for anchoring said bulb-holders, said intermediate position supporting a pair of the microswitches, said pair of microswitches being connected to a circuit molded along a lower side of said insulating support.

6. The handle assembly of claim 1, said conductors being positioned in a common sheath and extending through said flue.

7. The handle assembly of claim 1, said second body having a flexible surface formed of a small portion of rigid plastic that extends from one side of said cover to an opposite side of said cover, a layer of soft material being molded onto said small portion of rigid plastic.

8. The handle assembly of claim 1, said half-casing of said first body being formed of a longitudinal monolithic body having a trapezoidal cross-section, said half-casing being shaped so that at least one side thereof fits over a corresponding internal surface of a side of said trimming.

9. The handle assembly of claim 1, said counter-shaped cover having a series of openings at ends thereof, said series of openings having a seal around a perimeter of said series of openings, said seal forming a water-tight seal for said lens means.

10. The handle assembly of claim 1, said flue having a longitudinal dividing sector.

11. The handle assembly of claim 1, said flue having at least two tubular channels which are coaxial to each other.

12. The handle assembly of claim 1, said flue having at least two concentric channels of different diameters.

13. The handle assembly of claim 1, said flue being an elbow-shaped tubular element having a portion which is perpendicular with respect to said chamber and an orthogonal portion and a second perpendicular portion, a hole being formed on one side of said orthogonal portion which coincides with an end of said second perpendicular section.

14. The handle assembly of claim 1, said trimming having a seat formed along a lower side thereof and adjacent an interior of said trimming, said trimming having tabs formed therealong, said half-casing comprising:
   a protruding longitudinal tooth which clips into a corresponding seat; and
   flexible teeth which stick out from said half-casing and a correspond with a position of said tabs.

* * * * *